United States Patent
Golgiri et al.

(10) Patent No.: US 11,568,748 B2
(45) Date of Patent: Jan. 31, 2023

(54) METHOD AND APPARATUS FOR LOW FREQUENCY LOCALIZATION OF SURROUNDING VEHICLES

(71) Applicant: FORD GLOBAL TECHNOLOGIES, LLC, Dearborn, MI (US)

(72) Inventors: Hamid M. Golgiri, Dearborn, MI (US); Patrick Lawrence Jackson Van Hoecke, Westland, MI (US); Aaron Matthew Delong, Toledo, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/350,117

(22) Filed: Jun. 17, 2021

(65) Prior Publication Data
US 2021/0312810 A1 Oct. 7, 2021

Related U.S. Application Data

(63) Continuation of application No. 15/603,651, filed on May 24, 2017, now Pat. No. 11,069,246.

(51) Int. Cl.
| | |
|---|---|
| *G08G 1/017* | (2006.01) |
| *G08G 1/16* | (2006.01) |
| *G08G 1/14* | (2006.01) |
| *H04W 52/02* | (2009.01) |
| *H04W 64/00* | (2009.01) |
| *H04W 4/80* | (2018.01) |
| *G01S 1/04* | (2006.01) |
| *G01S 5/02* | (2010.01) |
| *H04W 8/00* | (2009.01) |

(52) U.S. Cl.
CPC .............. *G08G 1/168* (2013.01); *G01S 1/042* (2013.01); *G01S 5/0284* (2013.01); *G08G 1/017* (2013.01); *G08G 1/143* (2013.01); *G08G 1/163* (2013.01); *H04W 4/80* (2018.02); *H04W 52/0235* (2013.01); *H04W 64/003* (2013.01); *G08G 1/167* (2013.01); *H04W 8/005* (2013.01)

(58) Field of Classification Search
CPC .............................. G08G 1/168; G08G 1/017
See application file for complete search history.

(56) References Cited

U.S. PATENT DOCUMENTS

| | | | |
|---|---|---|---|
| 9,953,529 B2 * | 4/2018 | Puradchithasan | ........................... G08G 1/096791 |
| 10,584,968 B2 * | 3/2020 | Wang | .................. G06K 7/10386 |
| 2008/0049150 A1 | 2/2008 | Herbin et al. | |
| 2008/0268866 A1 | 10/2008 | Sukkarie | |

(Continued)

FOREIGN PATENT DOCUMENTS

AU 2014201513 A1 10/2014

*Primary Examiner* — Qutbuddin Ghulamali
(74) *Attorney, Agent, or Firm* — Michael Spenner; Brooks Kushman P.C.

(57) ABSTRACT

A system includes a first-vehicle processor configured to receive a signal broadcast from a second vehicle. The processor is also configured to determine a distance between a first transceiver, receiving the signal, and a second transceiver, transmitting the signal. The processor is further configured to determine second vehicle dimensions. Also, the processor is configured to digitally map a second vehicle perimeter around a second transceiver location, determined based on the distance and alert a first vehicle driver of a likely overlap condition of the second vehicle perimeter and a first vehicle perimeter.

16 Claims, 4 Drawing Sheets

(56) References Cited

U.S. PATENT DOCUMENTS

| | | |
|---|---|---|
| 2015/0070196 A1 | 3/2015 | Beaurepaire |
| 2015/0083921 A1* | 3/2015 | Ooyabu ................. G01S 7/006 |
| | | 250/341.8 |
| 2015/0130641 A1 | 5/2015 | Rahman et al. |
| 2015/0302750 A1* | 10/2015 | Choi ..................... G08G 1/141 |
| | | 340/932.2 |
| 2016/0129736 A1 | 5/2016 | Peine et al. |
| 2017/0025006 A1* | 1/2017 | Puradchithasan ........ B60Q 9/00 |

* cited by examiner

METHOD AND APPARATUS FOR LOW FREQUENCY LOCALIZATION OF SURROUNDING VEHICLES

CROSS-REFERENCE TO RELATED APPLICATIONS

This application is a continuation of U.S. application Ser. No. 15/603,651 filed May 24, 2017, now U.S. Pat. No. 11,069,246, issued Jul. 20, 2021, the disclosure of which is hereby incorporated in its entirety by reference herein.

TECHNICAL FIELD

The illustrative embodiments generally relate to methods and apparatuses for low frequency localization of surrounding vehicles.

BACKGROUND

Advanced safety and warning alert systems are provided on many vehicles that assist with blind spot warnings, collision warnings and avoidance, and even in automated parking assist. These advanced sensors often leverage LiDAR systems, which provide a reasonable representation of local objects.

For vehicles not equipped with LiDAR, there are sensors in current production that could be, or are used to determine where other vehicles are, such as 360° camera, ultrasonic sensors, and radar. However, each of these sensors has situations where they will not be able to determine where other vehicles are.

For example, a 360° camera will not perform to expectation in a low-light or no-light area, ultrasonic sensors have relatively short range, and do not usually provide full coverage on the vehicle, radar also may not provide full coverage on the vehicle. In addition, these current technologies are not always able to determine if the objects they detect are actually other vehicles. They are often able to merely detect the existence of an object.

SUMMARY

In a first illustrative embodiment, a system includes a first-vehicle processor configured to receive a signal broadcast from a second vehicle. The processor is also configured to determine a distance between a first transceiver, receiving the signal, and a second transceiver, transmitting the signal. The processor is further configured to determine second vehicle dimensions. Also, the processor is configured to digitally map a second vehicle perimeter around a second transceiver location, determined based on the distance and alert a first vehicle driver of a likely overlap condition of the second vehicle perimeter and a first vehicle perimeter.

In a second illustrative embodiment, a system includes a processor configured to determine that a first vehicle has entered a parking lot. The processor is also configured to receive a plurality of second vehicle wireless broadcasts. Also, the processor is configured to determine distances, based on the received signals, from the a first vehicle transceiver to second vehicle transceivers. The processor is further configured to determine second vehicle perimeters, around the second vehicle transceivers. The processor is additionally configured to digitally map the second vehicle perimeters to determine empty areas between second vehicles and display a parking map including the empty areas identified as potential parking spaces.

In a third illustrative embodiment, a system includes a processor configured to determine a broadcasting vehicle distance and perimeter in response to received wireless information, based on a determination of a distance between a receiving transceiver receiving the broadcast information and a transmitting transceiver transmitting the broadcast information and a determination of the perimeter around the transmitting transceiver. The processor is also configured to display a map including a receiving vehicle and the broadcasting vehicle defined by the determined perimeter, represented at the determined distance.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
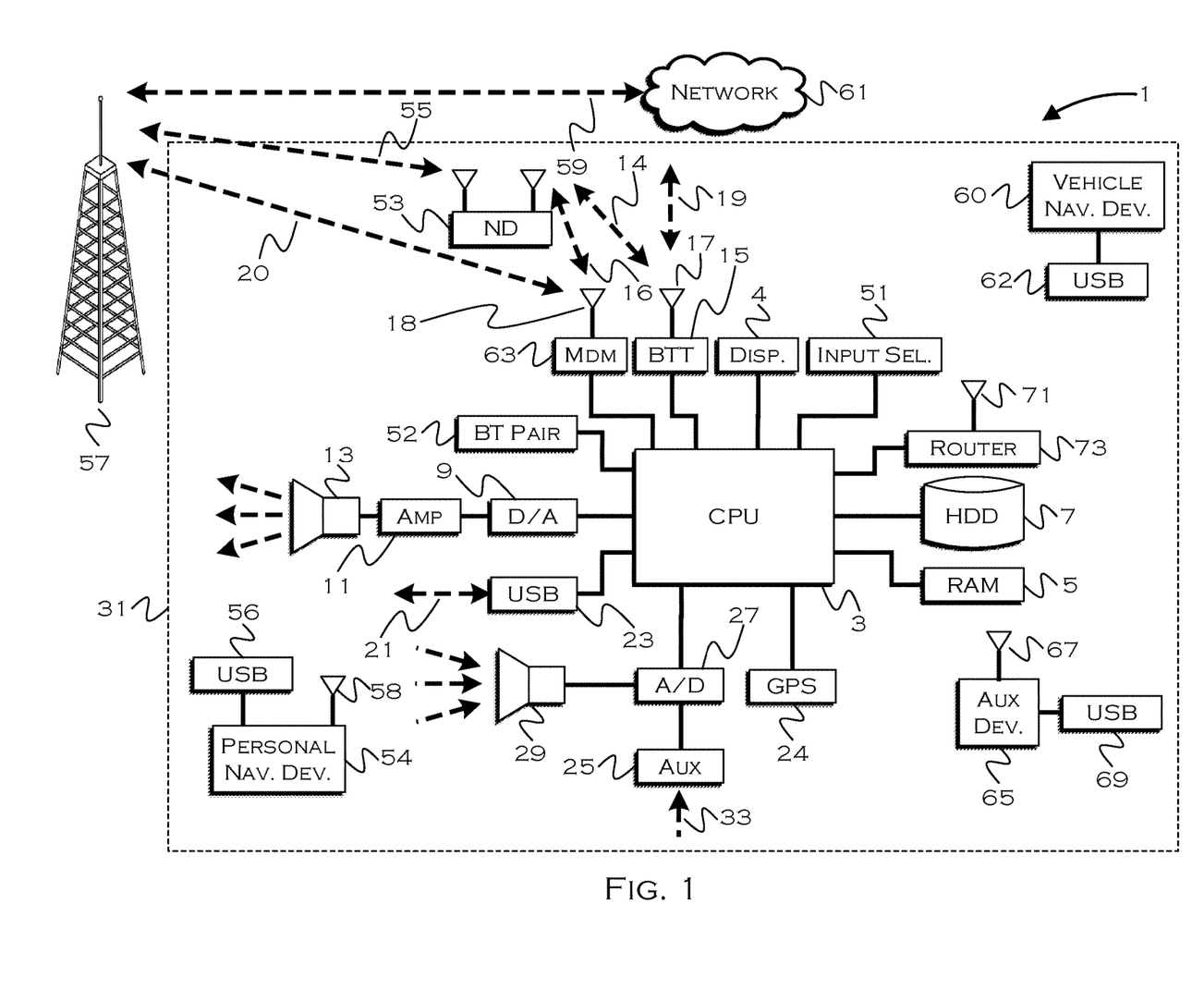
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLU- ETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Low Frequency (LF) signals, such as those used to detect a vehicle fob, can be used to accurately determine the location of another vehicle with respect to this vehicle, regardless of light conditions, or direction to the other vehicle. As opposed to current methods of detecting objects/other vehicles, LF data packets confirm that an object is actually a vehicle. This solution may help increase vehicle/driver awareness of other vehicles on the road while driving, as well as other vehicles that are parked. Detecting other vehicles with LF while driving could open up the door to new driver assist technologies and have a positive impact on current ones. For example, blind spot assistance currently uses radar to detect vehicles that are located in the blind spot of the current vehicle. With LF localization, it would be possible to detect a vehicle one or more lanes over that could potentially move to the current vehicle's blind spot while the current vehicle is merging to the same lane, which would cause a collision.

Current production systems for Passive-Entry/Passive-Start (PEPS) vehicles uses 125 kHz LF antennas to perform trilateration/localization of the PEPS keyfob. This localization utilizes standard Received Signal Strength Indicator (RSSI) data between the keyfob and multiple LF transmitters on the vehicle. Each of these transmitters inherently has a different RSSI value between themselves and the fob due to their location on the vehicle, which is taken advantage of in an algorithm that decides where the keyfob is based on these values.

A similar concept can be used to determine the location of another vehicle. By measuring the RSSI between LF transceivers of one vehicle to the LF transceivers of another, and feeding these values to a trilateration/localization algorithm, an accurate estimation of the location of other vehicles can be determined in real-time.

Figure 2:
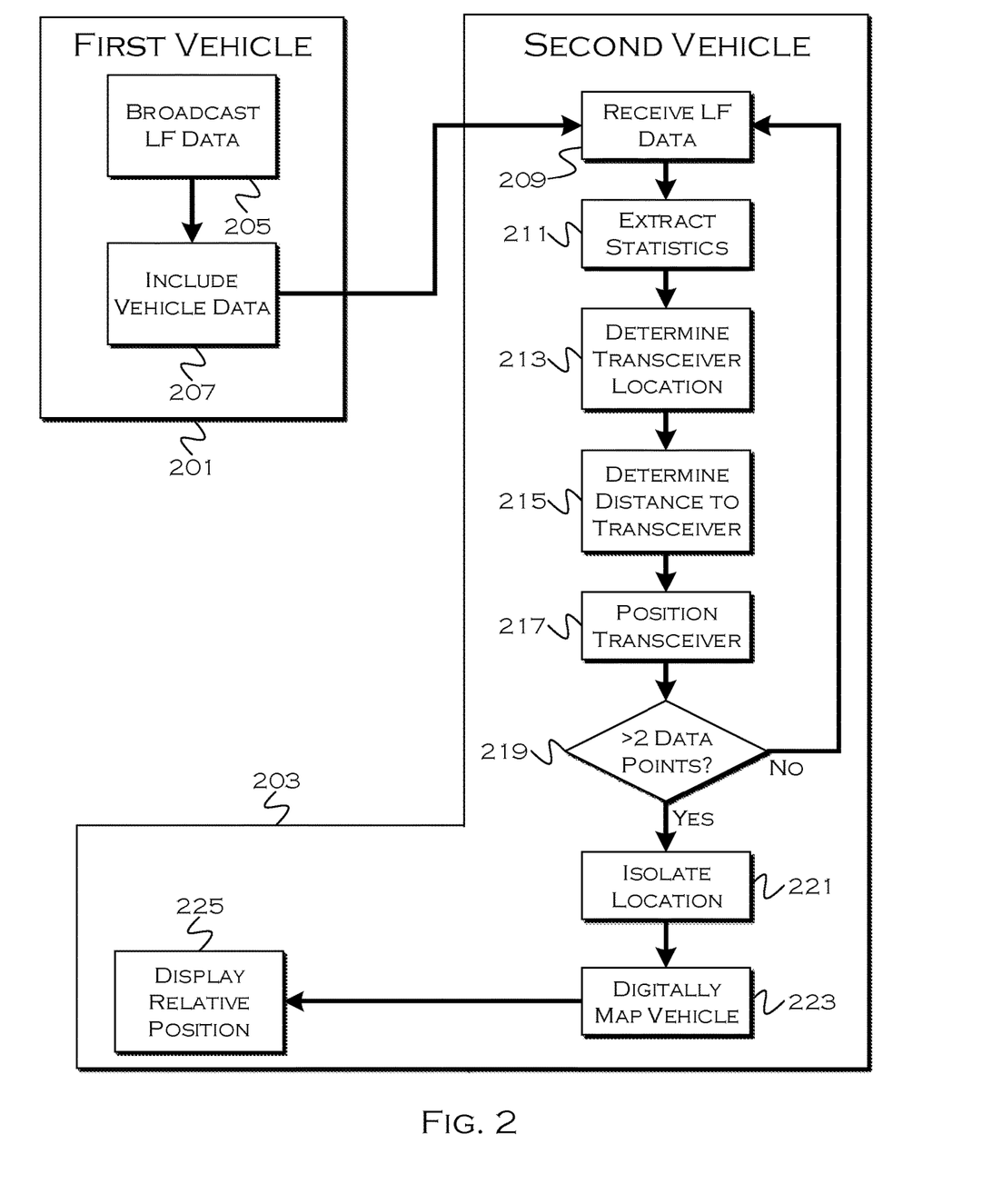
FIG. 2 shows an illustrative example of communication between the LF transceivers of two vehicles.

FIG. 2 shows an illustrative example of communication between the LF transceivers of two vehicles. In this illustrative example, a vehicle uses the LF transceiver that is typically used for fob communication, to communication with the LF transceiver of another vehicle. Using vehicle dedicated signals provides both an ability to communicate with other similarly equipped vehicles, and using these signals provides the ability to determine location with a high degree of accuracy. In many cases, each vehicle will include multiple LF transceivers, and so one-to-many communication or many-to-one communication can be used as described below to establish a location of a vehicle-of-interest.

Vehicle LF fob communication transceivers are capable of fob location determination within a +/−10 cm range. A similar concept can be used to determine the location of another signal receiving unit (and/or responding unit), although this will only tell the user the relative location of the transceiver. Since transceivers may be deployed at different locations in different vehicles, additional information about the deployment of a detected transceiver can assist in determining the layout of the vehicle around the transceiver.

In this example, traveling vehicles 201 use an LF transceiver to broadcast 205 an LF signal that can be detected by the transceiving unit of a nearby vehicle 203 or vehicles. Also, in this example, some form of vehicle data is included in the transmission, which can indicate, for example, a relative transceiver location (center, driver side, etc) or a model or other indicia that allows a receiving unit to determine the vehicle shape surrounding the transceiver. Other data can also be included, for example, such as a coordinate system indicating a perimeter around a transceiver.

For example, in one instance, the process may include information that the broadcasting unit is in the center of a FORD Explorer. This can be done through indicating a VIN (which also then uniquely identifies the vehicle, in case there are a number of local FORD Explorers), or a model, or even simply mathematical parameters. In the first two instances, the receiving unit may look up the dimensions of an Explorer and determine that the unit is located in the middle (by lookup or as part of the received signal) and determine that the vehicle extends 8 feet forward and rearward of the transceiver, and four feet to either side. Thus, a 16×8 rectangle around the transceiver location approximately indicates vehicle location.

In the latter example, the receiving vehicle may receive an indication of a central transceiver, with and indicator of +4 feet of vehicle on either side and +8 feet of vehicle forward and rearward. The receiving vehicle can then perform some simple math to digitally represent the transmitting vehicle, and can place the digitally represented vehicle on a digital map.

In cases where there is one-to-many or many-to-one communication, the process can use known broadcasting transceiver location information (the location within the vehicle) and identifiable or lookupable received information to determine the vehicle-of-interest's shape and relative location from the object vehicle.

The receiving vehicle 203 receives 209 the LF transmission and the vehicle identification data. The unit can extract 211 the relevant identification data and determine 213 the location of the transmitting transceiver within the transmitting vehicle. As noted, this could be done by a lookup in a local data table or by reference to location data included in the received signal.

The process in the receiving vehicle can also determine 215 the distance to the transmitting transceiver. The distance is the distance between the receiving transceiver and the transmitting transceiver, so some calculation will be needed taking into account both the intra-vehicular locations of the transmitting transceiver and the receiving transceiver. A single data point will give a relative distance of a transmitter, but unless a signal directionality or data about the transmitting vehicle is known (e.g., speed+heading or other movement data), the single data point represents a circumference of possible locations around the receiving unit.

Once the receiver has received more than one data point 219, the process can use the overlap of circumferences (as one example) to determine the location of the transmitting vehicle. In other instances, map data and/or transmitting vehicle speed and heading data can assist in determining the location of the transmitting vehicle. Any reasonable determination of location of a vehicle through multiple data points or based on speed, heading, etc, can be used.

In the one-to-many or many-to-one examples, a single transmission between the various transceivers can suffice to identify a local vehicle's location relative to an object vehicle. In the one-to-many case, a single onboard transceiver of the main (object) vehicle sends communication to a plurality of transceivers in a vehicle-of-interest. Since each of those transceivers has a fixed location within the vehicle and a relative location relative to each other, the incoming data can be analyzed to determine that, for example, Transceiver_1 (T1) is 13 feet away, Transceiver_2 (T2) is 15.5 feet away, Transceiver_3 (T3) is 15 feet away and Transceiver_4 (T4) is 18.5 feet away. If the transceivers were deployed in vehicle doors, and the process knew, for example, that T1 was in a front driver door, T2 was in a front passenger door, T3 was in a rear driver-side door and T4 was in the other rear door, the process could easily determine the relative position (only one vehicle-of-interest orientation and location would fit the data points) of the vehicle-of-interest.

A similar process could be performed by a many-to-one communication, although in that case road data or other information may be needed to finalize the heading of the vehicle of interest, as the many-to-one will identify a discrete point in space, but will not necessarily provide assurances about the heading of the vehicle-of-interest. A second transmission to any other LF transceiver in the vehicle of interest would solve this issue as well, provided that the relative locations of the two transceivers in the vehicle-of-interest was known or knowable (lookupable or included in the communications, for example).

The receiving unit will isolate 221 the likely transmitting transceiver location and digitally map 223 the transmitting vehicle on a digital map for display. This can include filling in a vehicle perimeter around the detected transmitting transceiver location. The receiving vehicle can then present 225 a display in the receiving vehicle that includes a display of the relative position of the detected transmitting vehicle.

Such determinations can be done quickly and accurately while a vehicle moves, and can assist a driver in mapping the location of surrounding vehicles. Since the data is based on wireless communication established between two vehicles, as opposed to, for example, a camera or radar, the vehicle can "know" that the detected and determined object is actually a vehicle, and not a road anomaly or road/geographic feature.

Even when the display capability is not enabled, the process can alert the driver of proximate vehicles by digitally representing (in memory) the current vehicle location and the transmitting vehicle locations and remaining aware of possible likely overlap (indicating a potential collision).

Figure 3:
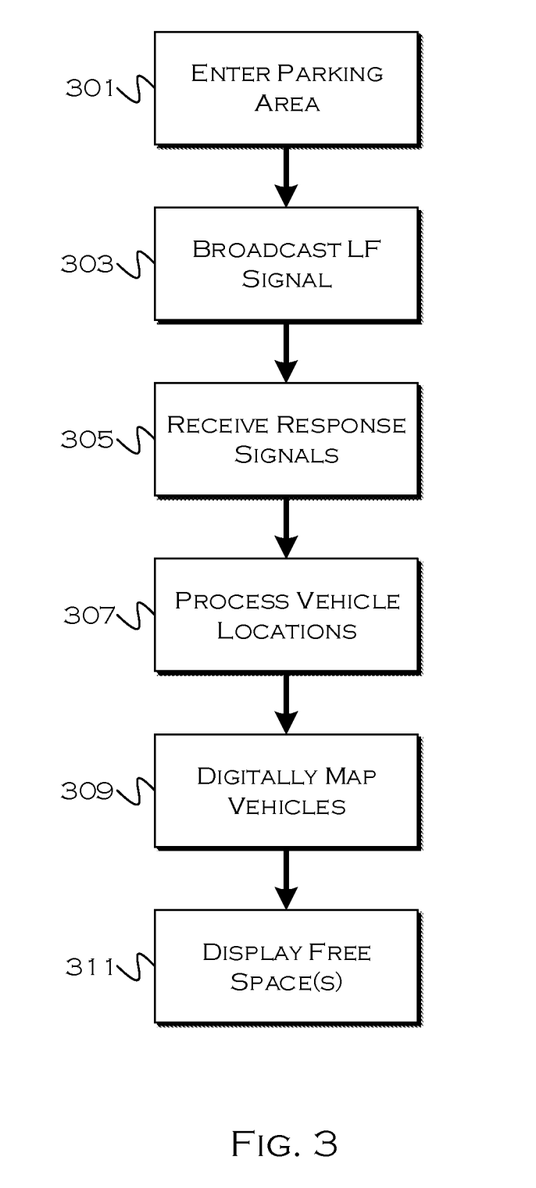
FIG. 3 shows an illustrative example of a parking space detection process using a similar vehicle location concept.

FIG. 3 shows an illustrative example of a parking space detection process using a similar vehicle location concept. While the vehicle transceiver may not have unlimited range, it may have a reasonable range allowing the vehicle to communicate with transceivers of locally parked vehicles. Since the receiving vehicle can determine the location of the transceivers in each of the locally parked vehicles, the unit can draw a reasonably approximate map of where vehicles are located within a parking lot. Again, either a direction of a signal should be known, or the receiving vehicle will need to move at least a defined amount, in order to isolate the location of each vehicle with respect to a received signal.

In this example, the vehicle determines 301 that the vehicle has entered a parking lot. This can be based on map data, for example, or could be based on receipt of a number of signals from a number of parked vehicles (indicating that the vehicle is likely in a parking lot). In this example, to preserve vehicle battery life in the parked vehicles, the interested (receiving) vehicle will wake the transceivers of the parked vehicles, in the same way a fob wakes the transceiver of an object vehicle when the owner presses a button on the fob.

The interested receiving vehicle broadcasts 303 an LF transmission signal which is received by the surrounding parked vehicles. Those vehicles wake and respond, similar to vehicles waking in response to a fob transmission. If battery life is not a concern, then those vehicles could also be continuously or periodically broadcasting their own LF data, in another paradigm.

Here, the receiving vehicle receives LF transmissions 305 from the parked surrounding vehicles, in a manner similar to receiving those signals as described with respect to FIG. 2. The received signals may again contain transmitting vehicle identification information, such as model or transceiver location, and the receiving vehicle can thus determine 307 the perimeter of each vehicle around the transmitting transceiver and the relative locations of the vehicles. These vehicles can be drawn 309 on a digital map, and in this instance some slight adjustment of vehicle location may be made based on facts known about parking lots (such as the fact that spaces are aligned in a regular manner in a typical lot). Any "blank" spaces not represented by a transmitting vehicle represent either open parking spaces or spaces with vehicles lacking this form of communication capability.

The receiving vehicle may display 311 the digital map for a driver, and the driver can visually identify potential open parking spaces. While the process may not be perfect (since non-transmitting vehicles may exist in spaced), the driver can at least avoid rows or areas where data indicates that there are not even any potential open spaces.

Figure 4:
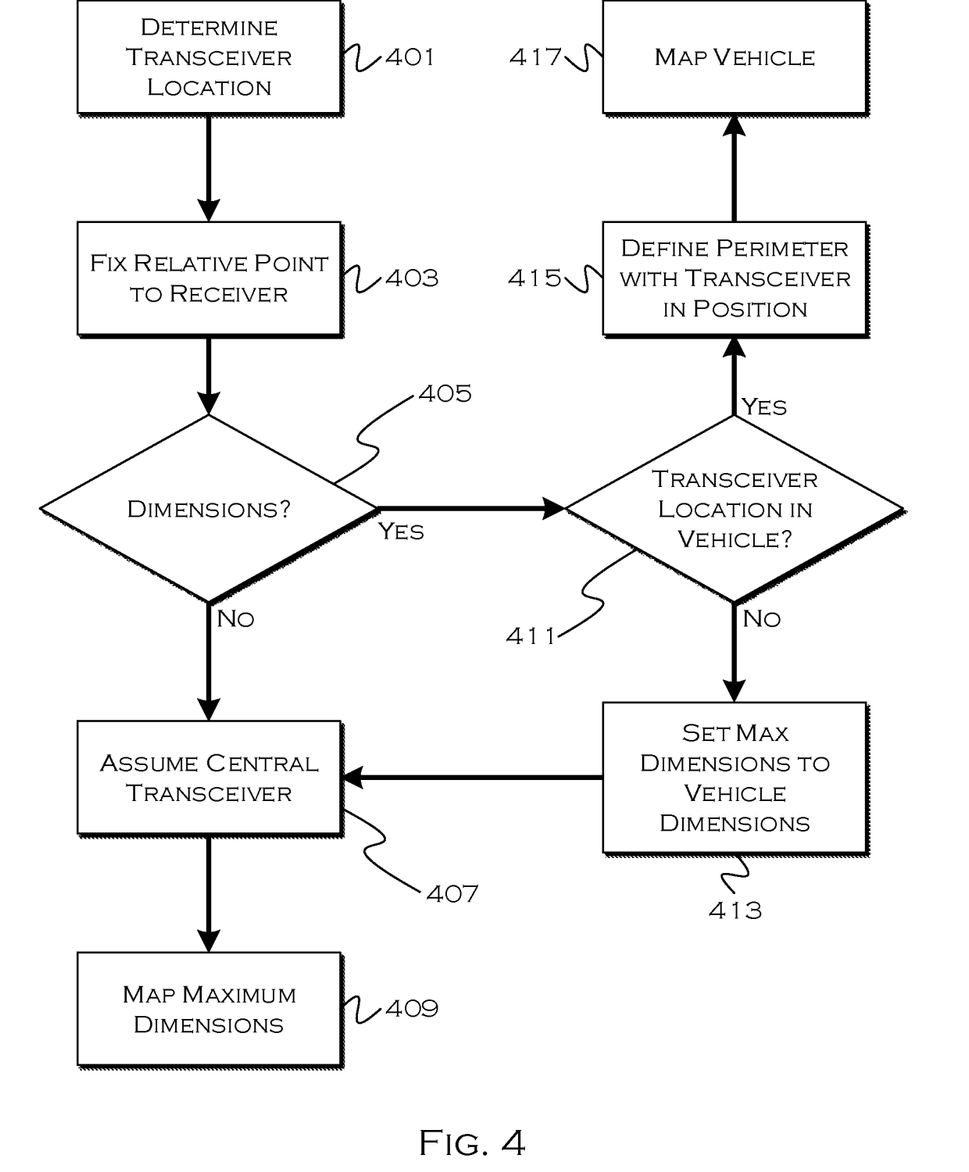
FIG. 4 shows an illustrative process for digitally mapping a vehicle.

FIG. 4 shows an illustrative process for digitally mapping a vehicle. In this example, a receiving vehicle has already received a transmission of an LF signal from a nearby vehicle. This non-limiting example shows one process for determining an approximate vehicular perimeter around a locally transmitting vehicle.

First, the process determines 401 the relative transceiver location of the transmitting transceiver. The process digitally maps 403 a fixed point representative of a current location of the detected transmitting transceiver. In this example, the process determines 405 first if the dimensions of the transmitting vehicle are known (e.g., lookupable or included in the received signal).

If the dimensions are not known, the process assumes 407 that the transceiver is centrally located within the vehicle. The process then maps 409 maximum vehicular dimensions (for either a large generic vehicle or for a known transmitting vehicle). In this example, mapping maximum dimensions may include, for example, mapping double the typical perimeter offset. That is, for the Explorer example above, the process may include mapping 8 feet on either side and 16 feet forwards and rearwards of the transmitting transceiver. This avoids any possible identification of a portion of the vehicle as not being where there is actually a portion of the vehicle, by essentially drawing a 4× vehicle box around the transceiver. Road, map and radar/lidar data can be used to narrow this definition to some extent, but the preceding over cautious example will accommodate placement of the transceiver at any vehicular location, without failing to identify a portion of the vehicle as not being where it actually is. There will be significant identification of portions of the vehicle where there is no vehicle, but this should at least help avoid failing to identify a potential collision object. Also, in this example, since no vehicle dimensions were known, a maximum set of dimensions that may be far bigger than the transmitting vehicle may be used.

When the dimensions of the transmitting vehicle are known, the process determines 411 if the relative location of the transmitting transceiver in the transmitting vehicle is known. If the relative location is unknown, the process may use 413 the known dimensions as the maximum dimensions, and proceed with the cautious mapping as discussed above. If the relative location of the transceiver is known (or can be looked up), the process may determine 415 a perimeter of the known dimensions around the location of the transceiver. The process may then map 417 this much more accurate representation.

In the instances of cautious overmapping, the process may use road data and other vehicle data to narrow the definition of a detected vehicle for which a perimeter is unknown. For example, overlap with another known vehicle location (or the current vehicle location) or overlap with offroad locations may represent areas that can be scrubbed from the overmapping. This can help present a more reasonable guess as to the location of the vehicle including the transmitter whose dimensions are unknown.

As previously noted, many of the steps outlined in FIG. 4 are resolved in a one-to-many or many-to-one communication scenario. If the vehicle can confidently determine the relative distance to multiple extra-vehicular transceivers, and knows the relative positions of those transceivers to each other, the vehicle can quickly and easily determine the distance to and positioning of the vehicle-of-interest. If the vehicle can confidently determine the relative distance from multiple onboard transceivers to a single transceiver of interest, the vehicle can, at a minimum, easily discern the relative location of the transceiver of interest. The additional mapping of the vehicle of interest could be facilitated as above, or could be done based on another transceiver location within that vehicle and/or knowledge of the interior location of the transceiver of interest and the surrounding vehicle.

Through use of the illustrative embodiments, existing vehicle wireless technology can be repurposed to determine the relative locations of surrounding vehicles and accurately map and draw those vehicles relative to an interested vehicle. This can assist drivers in understanding both a road and parking environment in a better manner.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a processor of a first vehicle configured to:
receive a signal broadcast, at a plurality of first transceivers of the first vehicle, from a second transceiver of a second vehicle;
determine distances between a plurality of first transceivers, receiving the signal, and the second transceiver;
determine a location of the second-vehicle transceiver within the second vehicle;
determine second vehicle dimensions based on information included in the received signal;
digitally map a second vehicle perimeter around the determined second-vehicle transceiver location, such that the perimeter encompasses the second vehicle and the second transceiver is at a location within the perimeter relative to the determined location of the second transceiver within the vehicle; and
alert a first vehicle driver of a likely overlap condition of the second vehicle perimeter and a first vehicle perimeter.

2. The system of claim 1, wherein the information includes the second vehicle dimensions.

3. The system of claim 1, wherein the information includes second vehicle identification information, and the processor is configured to look up the second vehicle dimensions based on the identification information.

4. The system of claim 1, wherein the processor is configured to determine the second transceiver location based on information included in the received signal.

5. The system of claim 4, wherein the information includes a second transceiver location within the second vehicle.

6. The system of claim 4, wherein the information includes second vehicle identification information, and the processor is configured to look up the second transceiver location within the second vehicle based on the identification information.

7. The system of claim 1, wherein the processor is configured to display a map including the first vehicle perimeter and the second vehicle perimeter.

8. The system of claim 7, wherein the processor is configured to determine a location of the second vehicle relative to the first vehicle, based on distances from the second transceiver relative to the first transceivers, determined based on the signal broadcast, and based on the determined location of the second transceiver within the vehicle, and to reflect this information in the display by positioning the second vehicle perimeter relative to the first vehicle perimeter based on the determined location of the second vehicle.

9. A system comprising:
a processor configured to:
determine that a first vehicle has entered a parking lot;
receive a plurality of second vehicle wireless signal broadcasts from parked second vehicles;
determine distances, based on the received signals, from a first vehicle transceiver to second vehicle transceivers of the parked second vehicles originating the broadcasts, including locations within the second vehicles of the second vehicle transceivers;

determine second vehicle perimeters, around the second vehicle transceivers, the perimeters encompassing the second vehicles and positioned around the second vehicles transceivers based on the relative locations of the second vehicle transceivers within a given second vehicle around which the perimeter is being drawn, such that the location of a given second vehicle transceiver within a given perimeter is relative to the location of the given second vehicle transceiver within the given second vehicle;

digitally map the second vehicle perimeters to determine empty areas between second vehicles based on gaps between exteriors of the second vehicle perimeters; and display a parking map including the empty areas identified as potential parking spaces.

10. The system of claim 9, wherein the plurality of second vehicle wireless broadcasts are received responsive to a wake signal broadcast by the first vehicle in response to entering the parking lot.

11. The system of claim 9, wherein the processor is configured to determine the second vehicle perimeters based on information included in the received signals.

12. The system of claim 11, wherein the information includes second vehicle dimensions.

13. The system of claim 11, wherein the information includes second vehicle identification information, and the processor is configured to look up second vehicle dimensions based on the identification information.

14. The system of claim 9, wherein the processor is configured to determine the location of the given second vehicle transceiver within the given second vehicle based on information included in the received signals.

15. The system of claim 14, wherein the information includes second vehicle dimensions.

16. The system of claim 15, wherein the information includes second vehicle identification information, and the processor is configured to look up second vehicle dimensions based on the identification information.

* * * * *